United States Patent
Wu et al.

(10) Patent No.: US 11,520,071 B2
(45) Date of Patent: Dec. 6, 2022

(54) MULTI-STEP INVERSION USING ELECTROMAGNETIC MEASUREMENTS

(71) Applicant: Halliburton Energy Services, Inc., Houston, TX (US)

(72) Inventors: Hsu-Hsiang Wu, Sugar Land, TX (US); Weixin Dong, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 424 days.

(21) Appl. No.: 16/474,239

(22) PCT Filed: Aug. 21, 2018

(86) PCT No.: PCT/US2018/047251
§ 371 (c)(1),
(2) Date: Jun. 27, 2019

(87) PCT Pub. No.: WO2020/040742
PCT Pub. Date: Feb. 27, 2020

(65) Prior Publication Data
US 2021/0356621 A1    Nov. 18, 2021

(51) Int. Cl.
*G01V 3/26* (2006.01)
*G01V 3/38* (2006.01)
(Continued)

(52) U.S. Cl.
CPC .................. *G01V 3/38* (2013.01); *G01V 3/26* (2013.01); *G01V 99/005* (2013.01); *G06N 20/00* (2019.01)

(58) Field of Classification Search
CPC ... G01V 3/38; G01V 3/26; G01V 3/28; G01V 3/30; G01V 99/005; G01V 3/18;
(Continued)

(56) References Cited

U.S. PATENT DOCUMENTS 6,430,509 B1   8/2002  Yin et al.
9,852,373 B2   12/2017 Stefano
(Continued)

FOREIGN PATENT DOCUMENTS

| WO | 2015051287 A1 | 4/2015 |
| WO | 2016137500 A1 | 9/2016 |
| WO | 2018208281 A1 | 11/2018 |

OTHER PUBLICATIONS

Christophe Dupuis and Jean-Michel Denichou, Automatic inversion of deep-directional-resistivity measurements for well placement and reservoir description, Special Section: Well geosteering, The Leading Edge, pp. 504-512, May 2015.
(Continued)

*Primary Examiner* — Jeffrey P Aiello
(74) *Attorney, Agent, or Firm* — Benjamin Ford; Parker Justiss, P.C.

(57) ABSTRACT

A subterranean earth formation is evaluated by running a process with a logging tool residing in a borehole in the earth formation to collect shallow measurements of a property of the formation and deep measurements of the property of the formation. An inversion is performed on the shallow measurements to produce a group of possible formation models that fit the shallow measurements. A machine-learning algorithm is applied to estimate the shallow formation structure, using the group of possible formation models that fit the shallow measurements, to produce a shallow formation structure. An inversion is performed on the deep measurements to produce a group of possible formation models that fit the deep measurements. The shallow formation structure is expanded using the group of possible formation models that fit the deep measurements to produce a deep formation structure.

17 Claims, 8 Drawing Sheets

(51) Int. Cl.
*G01V 99/00* (2009.01)
*G06N 20/00* (2019.01)

(58) Field of Classification Search
CPC .. G01V 1/282; G01V 1/50; G01V 2210/1429; E21B 47/00; E21B 49/00; G06N 20/00; G01N 27/22; G01N 24/081
USPC ..... 166/250.01; 324/303; 702/69, 11, 13–14
See application file for complete search history.

(56) References Cited

U.S. PATENT DOCUMENTS

| | | | | |
|---|---|---|---|---|
| 10,527,753 | B2* | 1/2020 | Dupuis | G01V 3/28 |
| 2003/0028324 | A1* | 2/2003 | Xiao | G01V 3/38 |
| | | | | 702/7 |
| 2004/0257240 | A1* | 12/2004 | Chen | G01V 3/38 |
| | | | | 340/853.1 |
| 2006/0095239 | A1* | 5/2006 | Frenkel | G01V 1/40 |
| | | | | 703/5 |
| 2006/0173624 | A1* | 8/2006 | Frenkel | G01V 3/265 |
| | | | | 702/7 |
| 2006/0214643 | A1* | 9/2006 | Angquist | H02J 3/381 |
| | | | | 322/17 |
| 2007/0083330 | A1* | 4/2007 | Frenkel | G01V 3/20 |
| | | | | 702/7 |
| 2009/0306900 | A1 | 12/2009 | Jing et al. | |
| 2017/0075021 | A1 | 3/2017 | Thiel et al. | |
| 2017/0123097 | A1* | 5/2017 | Fang | G01V 3/30 |
| 2017/0322339 | A1 | 11/2017 | Wessling et al. | |
| 2017/0329046 | A1 | 11/2017 | Palmowski et al. | |
| 2017/0371072 | A1 | 12/2017 | Shetty et al. | |

OTHER PUBLICATIONS

International Searching Authority, Patent Cooperation Treaty, International Search Report and Written Opinion, International application No. PCT/US2018/047251, entire document, which is a PCT parent of the instant application; dated May 2, 2019.

* cited by examiner

MULTI-STEP INVERSION USING ELECTROMAGNETIC MEASUREMENTS

BACKGROUND

Ultra-deep electromagnetic resistivity logging tools provide shallow measurements (i.e., measurements near the resistivity logging tool in a well bore) and deep measurements (i.e., measurements farther away from the resistivity logging tool than the shallow measurements). The shallow measurements and the deep measurements can be inverted to obtain an image of the formation around the borehole. Inversion of the shallow measurements typically produces an image of the formation around the well bore that has greater resolution than inversion of the deep measurements, but the depth of investigation with the shallow measurements is typically smaller than the depth of investigation with the deep measurements. It is a challenge to maintain the large depth of investigation from the deep measurements while preserving the fine resolution around the borehole provided by the shallow measurements.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

The techniques and equipment described herein will be described in the context of a wireline well logging system (see FIG. 1) and a drilling system (see FIG. 2). It will be understood that the techniques have application outside those fields.

Figure 1:
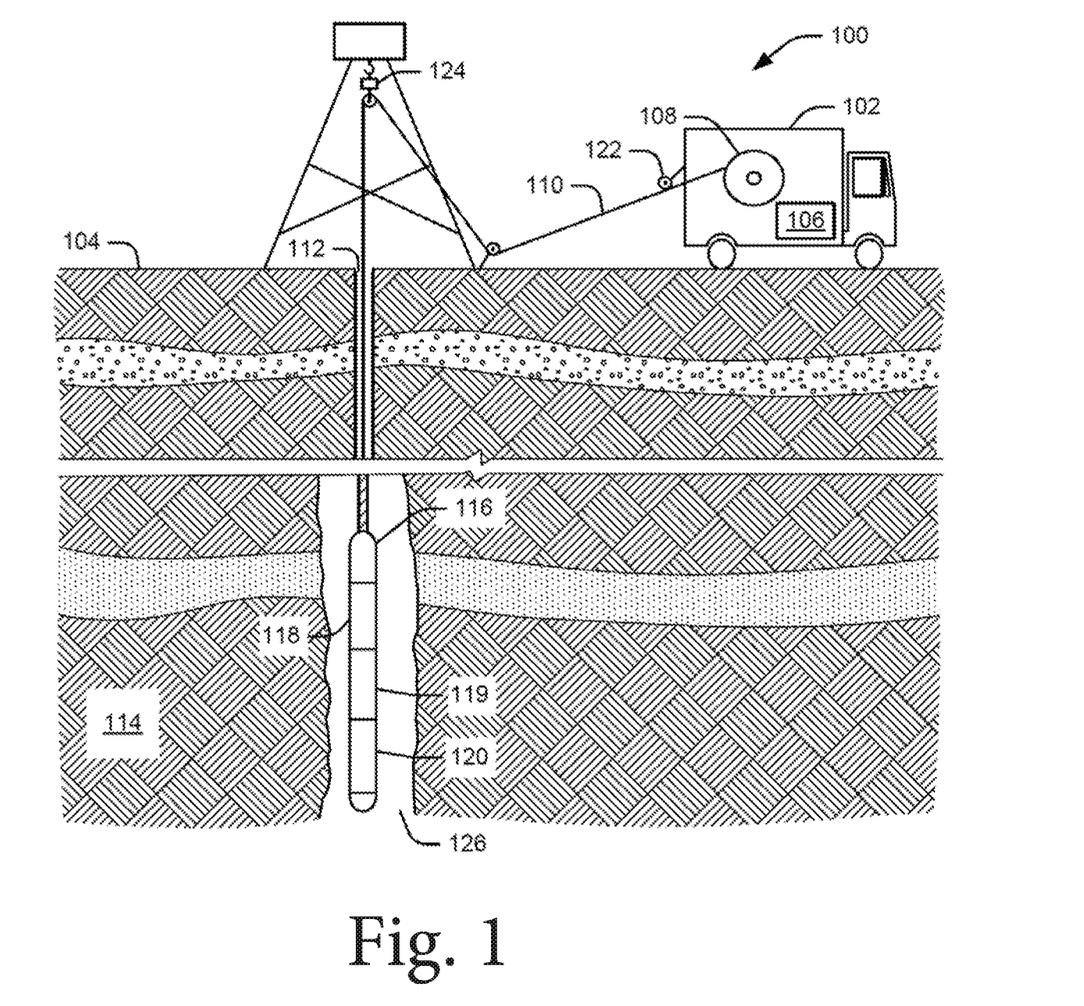
FIG. 1 is an illustration of a wireline well logging system.

FIG. 1 is an illustration of a wireline well logging system. In a wireline well logging system 100 at a well site, a logging truck or skid 102 on the earth's surface 104 houses a data gathering processor 106 and a winch 108 from which a logging cable 110 extends into a well bore 112 drilled into a formation 114. FIG. 1 is greatly simplified and for simplicity does not show many of the elements that are used in a wireline well logging system.

In one embodiment, the logging cable 110 suspends a logging tool string 116 within the well bore 112 to measure formation data as the logging tool string 116 is raised or lowered by the logging cable 110. In one embodiment, the logging tool string 116 is conveyed into the well bore 112 by coiled tubing (not shown). In one embodiment, in which the well bore 112 is a deviated well, the logging tool string 116 is conveyed into the well bore 112 by a tractor (not shown). In one embodiment, the logging tool string 116 includes a variety of "tools" or "sondes," such as tool or sonde 118, tool or sonde 119, and tool or sonde 120.

In one embodiment, as the logging tool string 116 is raised or lowered within the well bore 112, a depth encoder 122 provides a measured depth of the extended cable 110. In one embodiment, a tension load cell 124 measures tension in the logging cable 110 at the surface 104. In one embodiment, the volume within the well bore 112 around the logging tool string 116 is called the annulus 126.

Figure 2:
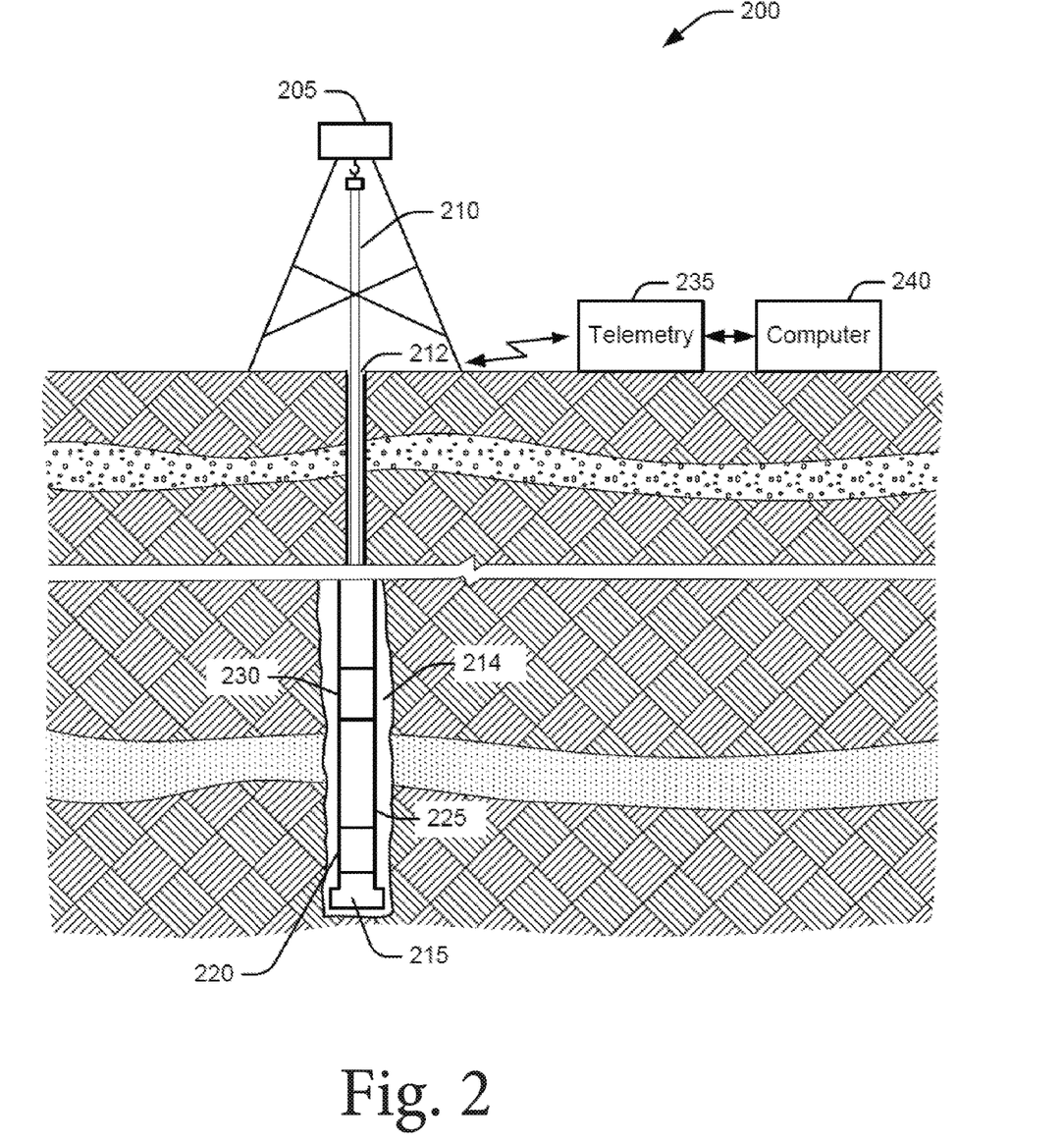
FIG. 2 is an illustration of a drilling system.

FIG. 2 is an illustration of a drilling system. A drilling system 200 includes a derrick 205 from which a drill string 210 is suspended in a well bore 212. FIG. 2 is greatly simplified and for simplicity does not show many of the elements that are used in the drilling process. Further, while FIG. 2 shows a land-based drilling system, the techniques and equipment described herein are also useful in a sea-based drilling system. In one embodiment, the volume within the well bore 212 around the drill string 210 is called the annulus 214. In one embodiment, the drill string includes a bit 215, a variety of tools or sondes, shown schematically by elements 220 and 225, and a telemetry section 230, through which the downhole equipment communicates with a surface telemetry system 235.

A processor 240 receives data from the downhole equipment and sends commands to the downhole equipment through the surface telemetry system 235. In one embodiment the processors 106 and 240 include input/output devices, memory, storage, and network communication equipment, including equipment necessary to connect to the Internet.

Figure 3:
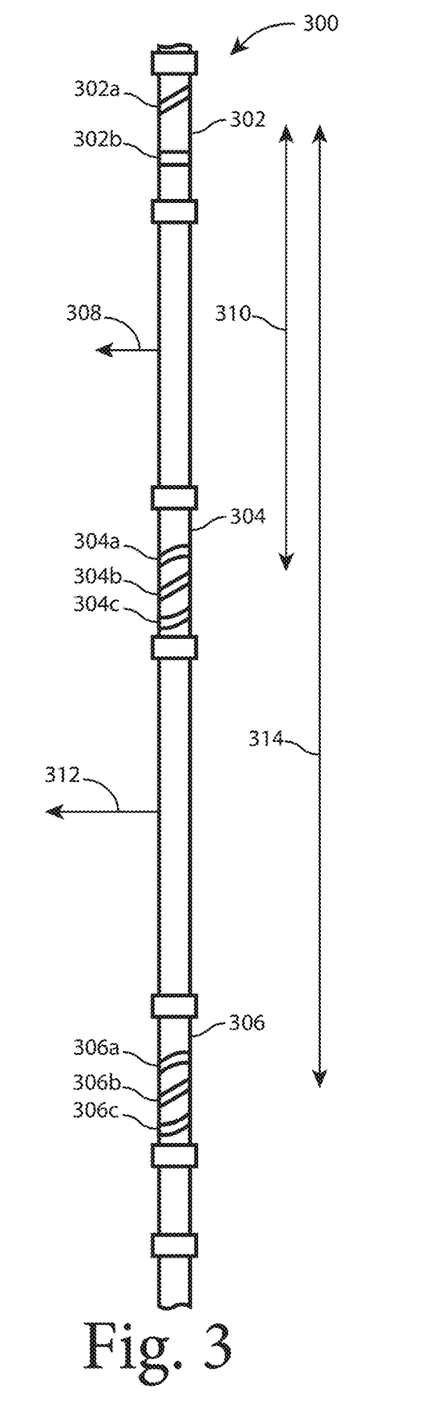
FIG. 3 is a plan view of an electromagnetic resistivity logging tool with two receiver subs.

FIG. 3 is a plan view of an electromagnetic resistivity logging tool with two receiver subs. An electromagnetic resistivity logging tool 300, which can be incorporated in the wireline well logging system 100 shown in FIG. 1 as tool or sonde 118, 119, or 120 or in the drilling system 200 shown in FIG. 2 as tool or sonde 220 or 225, may include a transmitter sub 302 which may include one or more transmitting elements 302a, 302b, such as antennas. The electromagnetic resistivity logging tool 300 may include a first-receiver sub 304, which may include one or more first-receiver receiving elements 304a, 304b, 304c, such as antennas. The electromagnetic resistivity logging tool 300 may include a second receiver sub 306, which may include one or more second-receiver receiving elements 306a, 306b, 306c, such as antennas.

The transmitter sub 302 and the two receiver subs 304, 305 provide different "depths of investigation," where depth of investigation (or "DOI") is defined to be the radial distance away from the tool 300 that a measurement can be accurately made. The transmitter sub 302 and the first receiver sub 304 provide the ability to perform resistivity measurements over a shallow depth of investigation 308 that is determined, in part, by the shallow-interval spacing 310 between the transmitter sub 302 and the first receiver sub 304. In one or more embodiments, the shallow depth of investigation 308 is typically approximately 60 feet. The transmitter sub 302 and the second receiver sub 306 provide the ability to perform resistivity measurements over a deep depth of investigation 312 that is determined, in part by the deep-interval spacing 314 between the transmitter sub 302 and the second receiver sub 306. In one or more embodiments, the deep depth of investigation 312 is typically more than 100 feet. Note that the distances shown on FIG. 3 may not be to scale.

As can be seen, the deep depth of investigation 312 penetrates a formation surrounding the tool, such as formation 114 shown in FIG. 1, to a greater depth than the shallow depth of investigation 308. Typically, however, the resolution of the data collected by the transmitter sub 302 and the first receiver sub 304 is greater than that collected by the transmitter sub and the second receiver sub 306.

Figure 4:
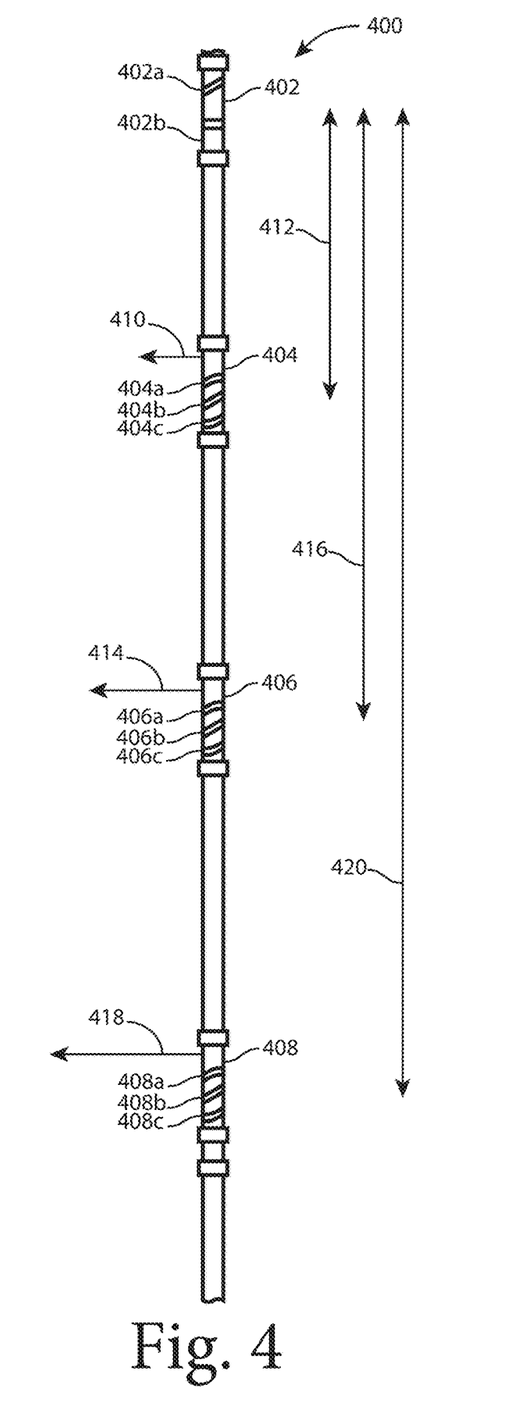
FIG. 4 is a plan view of an electromagnetic resistivity logging tool with three receiver subs.

FIG. 4 is a plan view of an electromagnetic resistivity logging tool with three receiver subs. An electromagnetic resistivity logging tool 400, which can be incorporated in the wireline well logging system 100 shown in FIG. 1 as tool or sonde 118, 119, or 120 or in the drilling system 200 shown in FIG. 2 as tool or sonde 220 or 225, may include a transmitter sub 402 which may include one or more transmitting elements 402a, 402b, such as antennas. The electromagnetic resistivity logging tool 400 may include a first receiver sub 404, which may include one or more first-receiver receiving elements 404a, 404b, 404c, such as antennas. The electromagnetic resistivity logging tool 400 may include a second receiver sub 306, which may include one or more second-receiver receiving elements 406a, 406b, 406c, such as antennas. The electromagnetic resistivity logging tool 400 may include a third receiver sub 408, which may include one or more third-receiver receiving elements 408a, 408b, 408c, such as antennas.

The transmitter sub 402 and the three receiver subs 404, 406, 408 provide different depths of investigation. The transmitter sub 402 and the first receiver sub 404 provide the ability to perform resistivity measurements over a shallow depth of investigation 410 that is determined, in part by the shallow-interval spacing 412 between the transmitter sub 402 and the first receiver sub 404. In one or more embodiments, the shallow depth of investigation 410 is typically approximately 60 feet. The transmitter sub 402 and the second receiver sub 406 provide the ability to perform resistivity measurements over a deep depth of investigation 414 that is determined, in part by the deep-interval spacing 416 between the transmitter sub 402 and the second receiver sub 406. In one or more embodiments, the deep depth of investigation 414 is typically more than 100 feet. The transmitter sub 402 and the third receiver sub 406 provide the ability to perform resistivity measurements over a deeper depth of investigation 418 that is determined, in part, by the deeper-interval spacing 420 between the transmitter sub 402 and the third receiver sub 408. In one or more embodiments, the deeper depth of investigation 418 is typically more than the deep depth of investigation 414. Note that the distances shown on FIG. 4 may not be to scale.

As can be seen, the deep depth of investigation 414 penetrates a formation surrounding the tool, such as formation 114 shown in FIG. 1, to a greater depth than the shallow depth of investigation 410. Similarly, the deeper depth of investigation 418 penetrates the formation to a greater depth than the deep depth of investigation 414. Typically, the resolution of the data collected by the transmitter sub 402 and the first receiver sub 404 is greater than that collected by the transmitter sub 402 and the second receiver sub 406 or the transmitter sub 402 and the third receiver sub 408. Further, the resolution of the data by the transmitter sub 402 and the second receiver sub 406 is greater than that collected by the transmitter sub 402 and the third receiver sub 408.

Figure 5A:
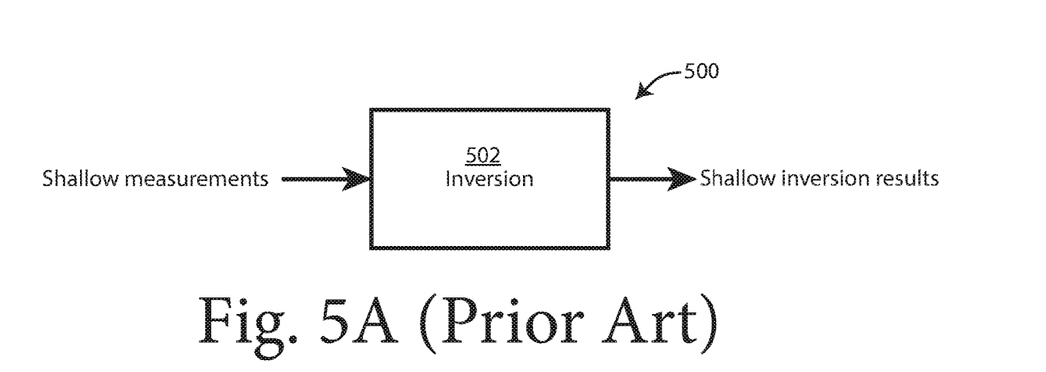
FIG. 5A is a block diagram of a prior art system to invert shallow measurements.

FIG. 5A is a block diagram of a prior art system to invert shallow measurements. In a prior art system 500 to invert shallow measurements, shallow measurements, such as those collected by the transmitter sub 302 and the first receiver sub 304 or the transmitter sub 402 and first receiver sub 404, are fed into an inversion 502 to produce shallow inversion results.

Figure 5B:
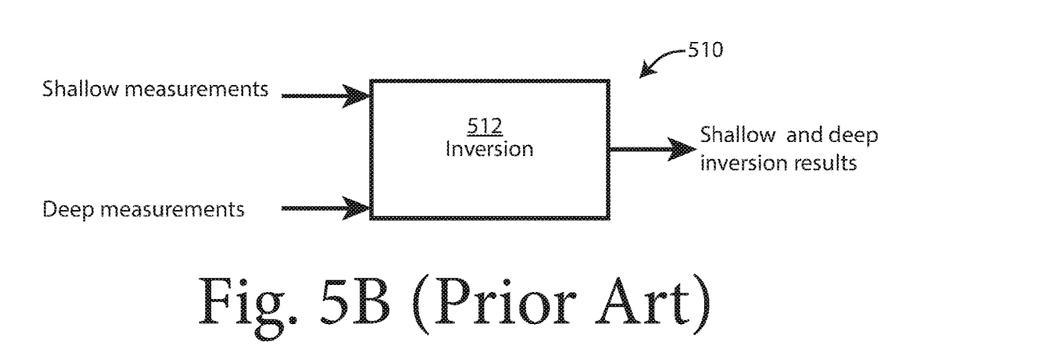
FIG. 5B is a block diagram of a prior art system to invert shallow measurements and deep measurements.

FIG. 5B is a block diagram of a prior art system to invert shallow measurements and deep measurements. In a prior art system 510 to invert shallow measurements and deep measurements, shallow measurements, such as those collected by the transmitter sub 302 and the first receiver sub 304 or the transmitter sub 402 and first receiver sub 404, and deep measurements, such as those collected by the transmitter sub 302 and the second receiver sub 306 or the transmitter sub 402 and second receiver sub 406, are fed into an inversion 512 to produce shallow and deep inversion results. The inversion 512 assumes a one-dimensional ("1D") layered model within X feet above and below the well bore, where X is the depth of investigation.

Figure 5C:
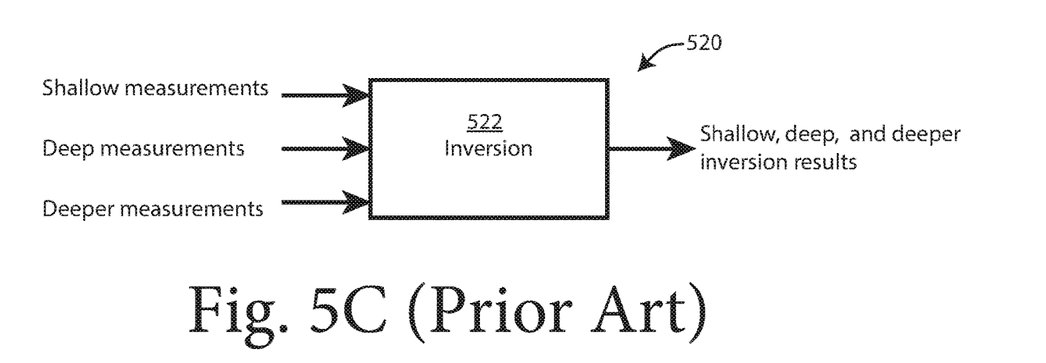
FIG. 5C is a block diagram of a prior art system to invert shallow measurements, deep measurements, and deeper measurements.

FIG. 5C is a block diagram of a prior art system to invert shallow measurements, deep measurements, and deeper measurements. In a prior art system 520 to invert shallow measurements, deep measurements, and deeper measurements, shallow measurements, such as those collected by the transmitter sub 302 and the first receiver sub 304 or the transmitter sub 402 and first receiver sub 404, deep measurements, such as those collected by the transmitter sub 302 and the second receiver sub 306 or the transmitter sub 402 and second receiver sub 406, and deeper measurements, such as those collected by the transmitter sub 402 and third receiver sub 408, are fed into an inversion 522 to produce shallow and deep inversion results.

Figure 6A:
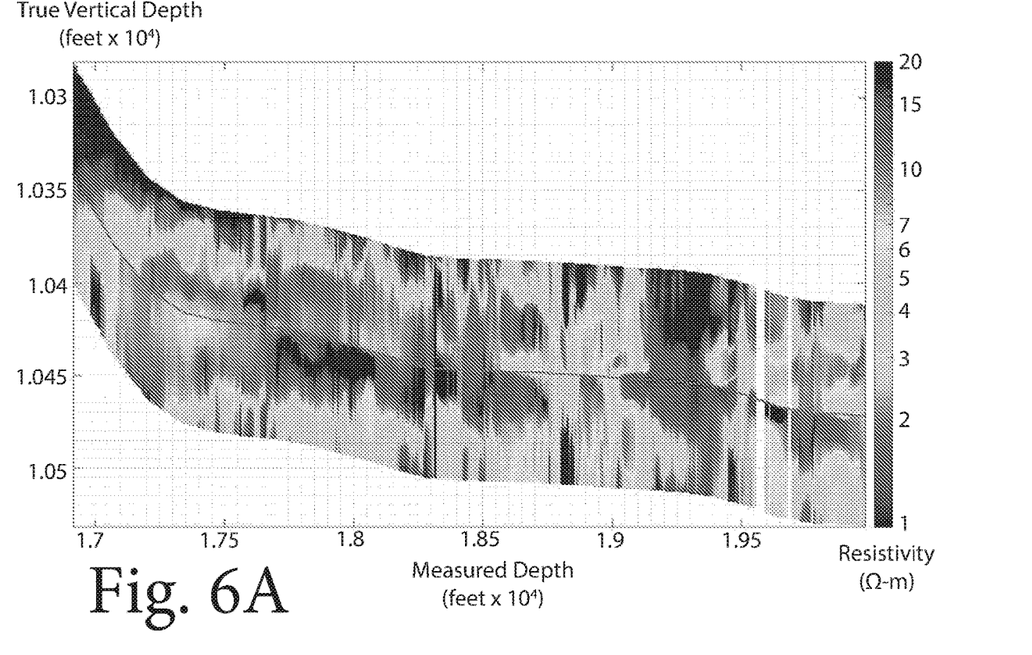
FIG. 6A is a graph showing inversion results from shallow measurements.

FIG. 6A is a graph showing inversion results from shallow measurements. FIG. 6A shows an example of inversion results using only shallow measurements, such as the result from the inversion 502 shown in FIG. 5A.

Figure 6B:
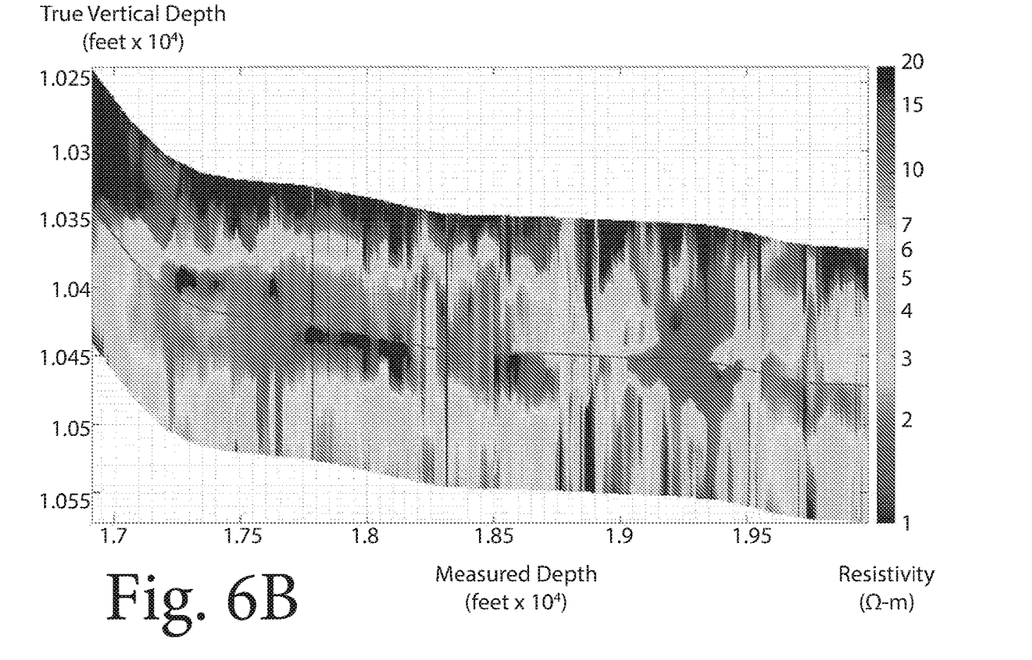
FIG. 6B is a graph showing inversion results from shallow measurement and deep measurements.

FIG. 6B is a graph showing inversion results from shallow measurement and deep measurements. FIG. 6B shows an example of inversion results using shallow measurements and deep measurements, such as the result from the inversion 512 shown in FIG. 5B. The DOI for such an inversion is determined by the deep-interval spacing 314, 416. This inversion of shallow measurements and deep measurements usually has lower resolution around the well bore than the inversion from the shallow measurements alone.

Figure 7:
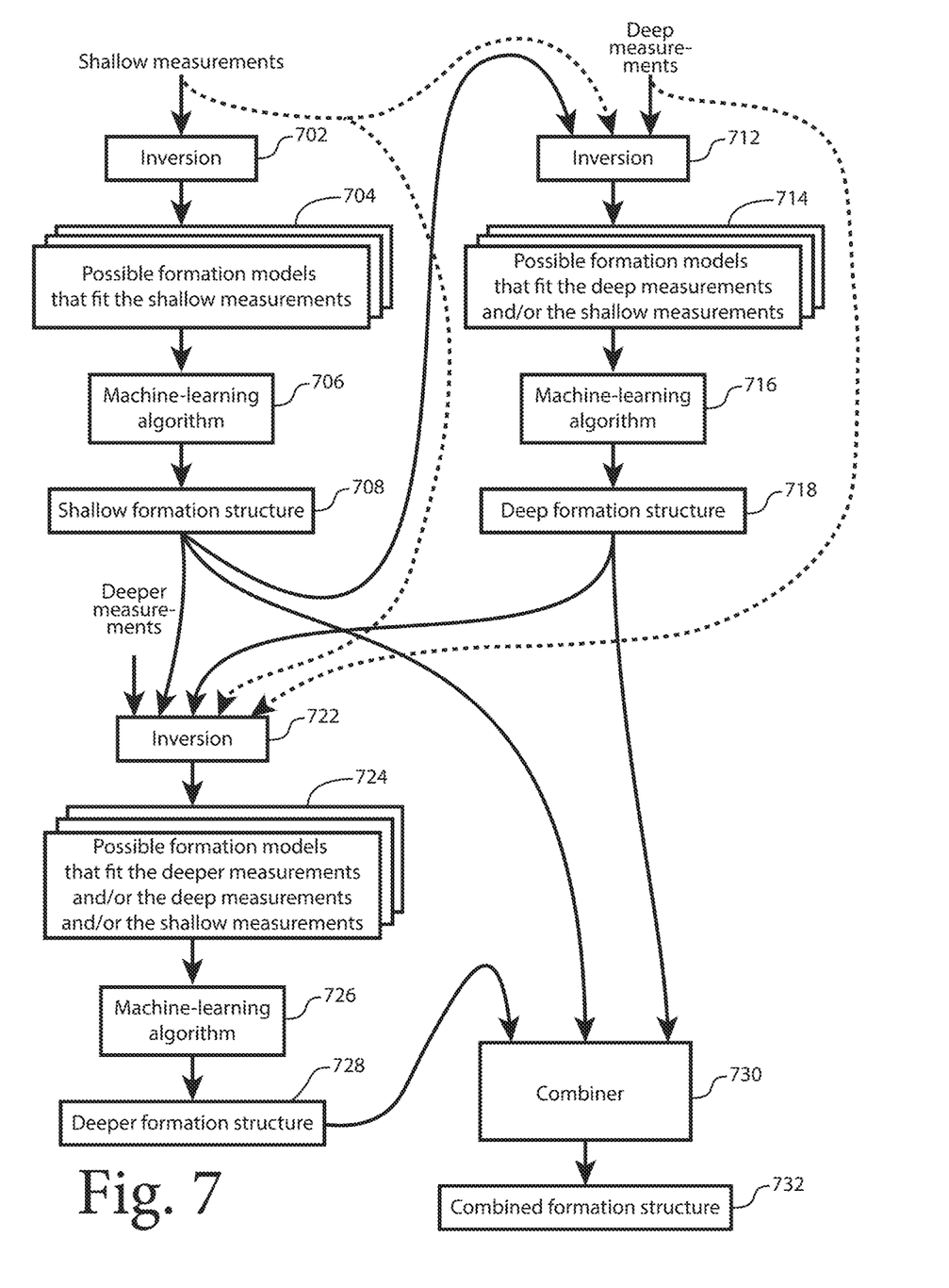
FIG. 7 is a block diagram of processing to perform a multi-step inversion.

FIG. 7 is a block diagram of processing to perform a multi-step inversion. In a multi-step inversion, shallow measurements, taken for example with the transmitter sub 302 and the first receiver sub 304 or with the transmitter sub 402 and the first receiver sub 404, are processed by an inversion 702 to produce a group of possible formation models that fit the shallow measurements 704. These models 704 are run through a machine-learning algorithm 706 to estimate the shallow formation structure 708.

Deep measurements, taken for example with the transmitter sub 302 and the second receiver sub 306 or with the transmitter sub 402 and the second receiver sub 406, and optionally the shallow measurements are processed by an inversion 712 to produce a group of possible formation models that fit the deep measurements and/or the shallow measurements 714. In one or more embodiments, the inversion 712 uses the shallow formation structure 708 as a starting point to determine the possible formation models that fit the deep measurements and/or the shallow measurements 714. The models 714 are run through a machine-learning algorithm 716 to estimate the deep formation structure 718.

Optionally, deeper measurements, taken for example with the transmitter sub 402 and the third receiver sub 408, and optionally the shallow measurements and the deep measurements are processed by an inversion 722 to produce a group of possible formation models that fit the deeper measurements and/or the deep measurements and/or the shallow measurements 724. In one or more embodiments, the inversion 722 uses the deep formation structure 718 and/or the shallow formation structure 708 as a starting point to determine the possible formation models that fit the deeper measurements and/or the deep measurements and/or the shallow measurements 724. The models 724 are run through a machine-learning algorithm 726 to estimate the deeper formation structure 728.

A combiner 730 combines the shallow formation structure 708, the deep formation structure 718, and optionally the deeper formation structure 728 to produce a combined formation structure 732.

The machine-learning algorithms 706, 716, 726 may include the algorithms described in International Patent Application No. PCT/US17/31604, entitled "System and Method for Evaluating a Formation Using a Statistical Distribution of Formation Data," filed on May 8, 2017, which is owned by the applicant of the present application. At a high level, those algorithms take the possible formation models 704, 714, 724, generate a histogram of a parameter of the possible formation models based on formation boundary positions, identify peaks within the histogram, select possible formation models corresponding to the identified peaks, and choose the formation structure 708, 718, 728 from among the possible formation models.

Figure 8:
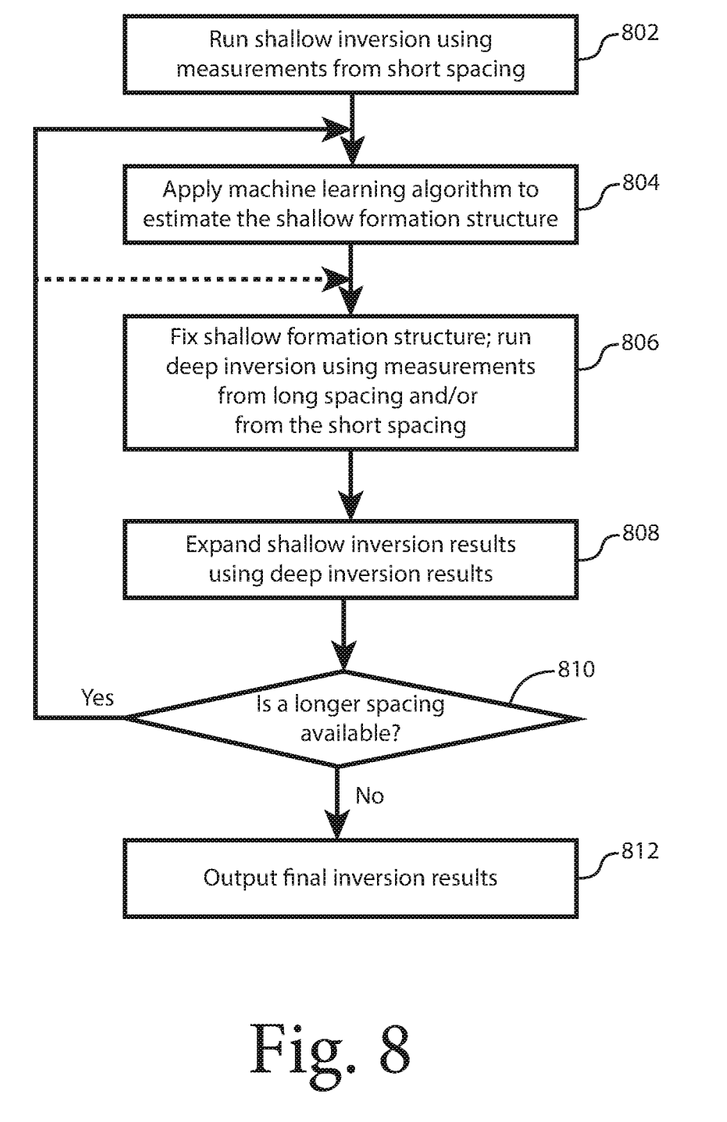
FIG. 8 is a flow chart of a multi-step inversion.

FIG. 8 is a flow chart of a multi-step inversion. A multi-step inversion begins by running a shallow inversion using measurements from short spacing (block 802). That is, an inversion is performed on shallow measurements, taken for example with the transmitter sub 302 and the first receiver sub 304 or with the transmitter sub 402 and the first receiver sub 404, to produce a group of possible formation models that fit the shallow measurements, e.g., possible formation models that fit the shallow measurements 704.

The shallow formation structure is then fixed in place and a deep inversion is run using measurements from the long spacing and/or from the short spacing (block 806). That is, a process, such as the combiner 730, establishes the shallow formation structure, such as shallow formation structure 708, as the formation structure for a shallow depth of investigation, such as the shallow depth of investigation 308, the shallow depth of investigation 410.

Further explaining block 806, a deep inversion, such as deep inversion 712, is run on deep measurements, taken for example with the transmitter sub 302 and the second receiver sub 306 or with the transmitter sub 402 and the second receiver sub 406, and/or on shallow measurements, taken for example with the transmitter sub 302 and the first receiver sub 304 or with the transmitter sub 402 and the first receiver sub 404, to produce possible formation models that fit the deep measurements, such as possible formation models that fit the deep measurements and/or the shallow measurements 714, and the possible formation models that fit those measurements are run through a machine-learning algorithm, such as machine-learning algorithm 716, to produce a deep formation structure, such as deep formation structure 718.

The shallow inversion results are then expanded using the deep inversion results (block 808). That is, a process, such as the combiner 730, establishes the deep formation structure, such as deep formation structure 708, as the formation structure for a depth of investigation between the extent of the shallow depth of investigation, such as shallow depth of investigation 308 or shallow depth of investigation 410, and the extent of the deep depth of investigation, such as deep depth of investigation 312 or deep depth of investigation 414.

The process then determines if data from a longer spacing is available (block 810). That is, a determination is made as to whether data collected from a transmitter sub 402 and a third receiver sub 408 is available, or on subsequent passes through the illustrated loop whether even longer spaced transmitters and receivers are available. If not ("No" branch from block 810), the final inversion results are output (block 812) as, for example, the combined formation structure 732.

If data from a longer spacing is available ("Yes" branch from block 810), the process returns to block 804. Optionally, rather than returning to block 804, the estimate of the shallow formation structure from the preceding iteration through the loop is used, and the loop returns to block 806 and processes the data from the longer spacing in the same way that the data from the long spacing was performed.

Figure 9:
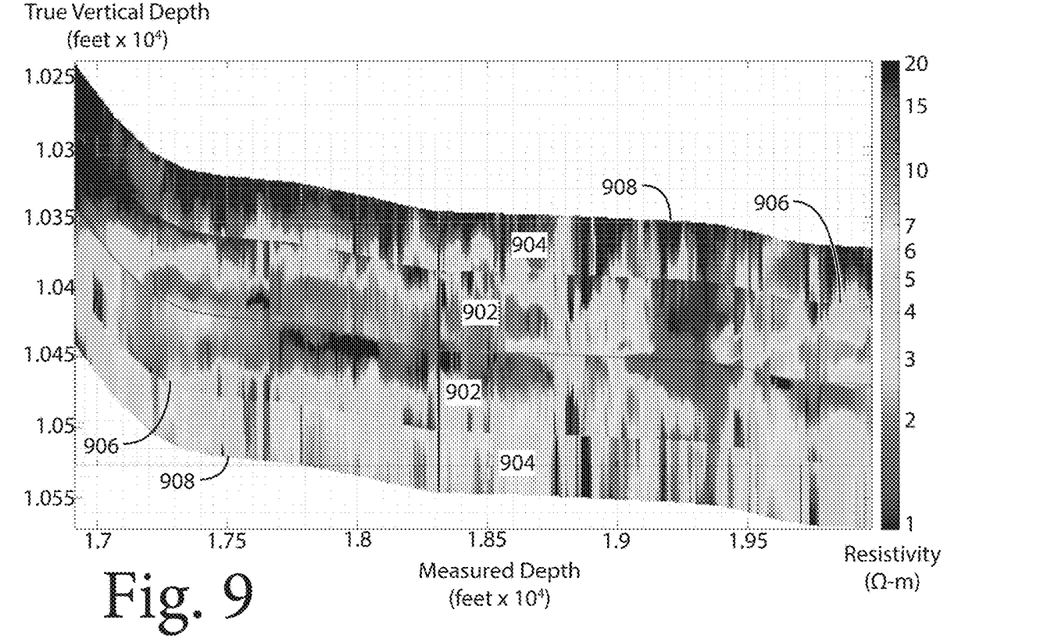
FIG. 9 is a chart showing a possible combined formation structure incorporating shallow measurements and deep measurements.

FIG. 9 is a chart showing a possible combined formation structure incorporating shallow measurements and deep measurements. As can be seen, the combined formation structure uses the shallow formation structure 902 for the shallow depth of investigation and the deep formation structure 904 for the region between the extent of the shallow depth of investigation 906 and the extent of the deep depth of investigation 908.

Figure 10:
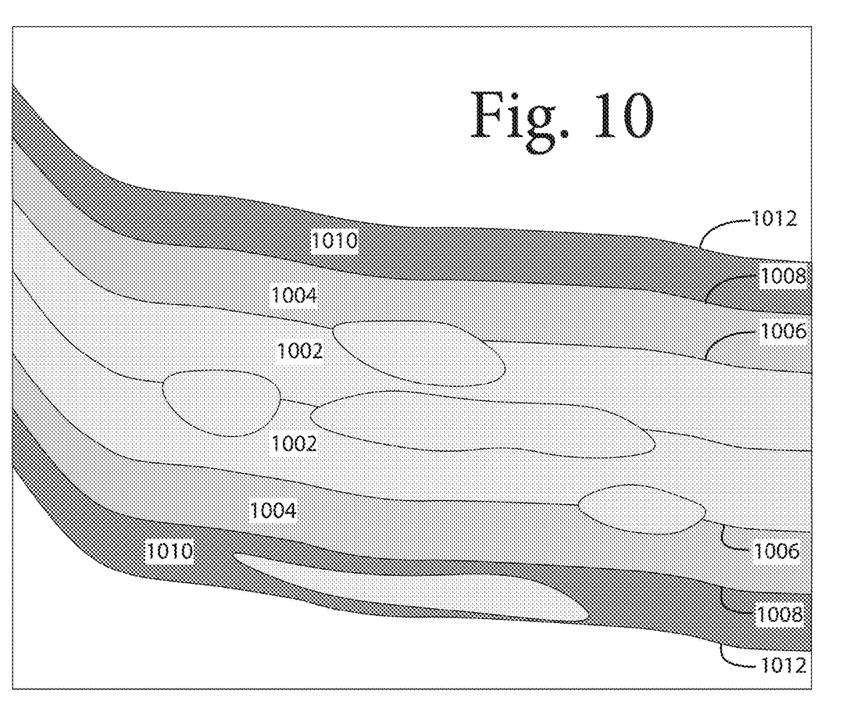
FIG. 10 is a chart showing a combined formation structure incorporating shallow measurements, deep measurements, and deeper measurements.

FIG. 10 is a chart showing a combined formation structure incorporating shallow measurements, deep measurements, and deeper measurements. The formation structures have been idealized for illustration purposes. As can be seen, the combined formation structure uses the shallow structure 1002 for the shallow depth of investigation, the deep formation structure 1004 for the region between the extent of the shallow depth of investigation 1006 and the extend of the deep depth of investigation 1008, and the deeper formation structure 1010 for the region between the extent of the shallow depth of investigation 1008 and the extend of the deeper depth of investigation 1012.

The combined formation structure 732 can be used for prospecting for hydrocarbons, planning well drilling, controlling well drilling, production analysis, reservoir analysis, and other similar activities.

In one aspect, a method of evaluating a subterranean earth formation includes running a process with a logging tool residing in a borehole in the earth formation to collect shallow measurements of a property of the formation, defined to be measurements of the property of the formation adjacent the borehole and adjacent the logging tool, and deep measurements of the property of the formation, defined to be measurement of the property of the formation farther away from the logging tool than the shallow measurements. The method includes performing an inversion on the shallow measurements to produce a group of possible formation models that fit the shallow measurements. The method includes applying a machine-learning algorithm to estimate the shallow formation structure, using the group of possible formation models that fit the shallow measurements, to produce a shallow formation structure. The method includes performing an inversion on the deep measurements to produce a group of possible formation models that fit the deep measurements. The method includes expanding the shallow formation structure using the group of possible formation models that fit the deep measurements to produce a deep formation structure.

Implementations may include one or more of the following. Performing an inversion on the deep measurements may include performing an inversion on one or more of the shallow measurements and the deep measurements and may include starting the inversion with the group of possible formation models that fit the shallow measurements. The method may include, after expanding the fixed shallow formation structure using the group of possible formation models: determining that deeper measurements of the property of the formation, defined to be measurements by the logging tool of the property of the formation farther away from the logging tool than the deep measurements, are available and, in response: performing an inversion on one or more of the shallow measurements, the deep measurements, and the deeper measurements to produce a group of possible formation models that fit the deeper measurements, and expanding the deep formation structure using the group of possible formation models that fit the deeper measurements to produce a deeper formation structure. Performing an inversion on one or more of the shallow measurements, the deep measurements, and the deeper measurements may include starting the inversion with one or more of the group of possible formation models that fit the shallow measurements and the group of possible formation models that fit the deep measurements. The response to determining that deeper measurements of the property of the formation are available may include, before performing the inversion on the deeper measurements: re-applying the machine-learning algorithm to estimate the shallow formation structure, using the group of possible formation models that fit the shallow measurements, to produce the shallow formation structure. Expanding the fixed shallow formation structure may include fixing the formation inversion results at the shallow formation structure for a shallow radial interval from a wall of the borehole to a shallow distance from the wall of the borehole; applying the machine-learning algorithm to estimate the deep formation structure, using the group of possible formation models that fit the deep measurements, to produce a deep formation structure; fixing the formation inversion results at the deep formation structure for a deep radial interval from the shallow distance from the wall of the borehole to a deep distance from the wall of the borehole; applying the machine-learning algorithm to estimate the deeper formation structure, using the group of possible formation models that fit the deeper measurements, to produce a deeper formation structure; and fixing the formation inversion results at the deeper formation structure for a deeper radial interval from the deep distance from the wall of the borehole to a deeper distance from the wall of the borehole. Rxpanding the fixed shallow formation structure may include fixing the formation inversion results at the shallow formation structure for a shallow radial interval from a wall of the borehole to a shallow distance from the wall of the borehole; applying the machine-learning algorithm to estimate the deep formation structure, using the group of possible formation models that fit the deep measurements, to produce a deep formation structure; and fixing the formation inversion results at the deep formation structure for a deep radial interval from the shallow distance from the wall of the borehole to a deep distance from the wall of the borehole.

In one aspect, a system for evaluating a subterranean earth formation includes a logging tool residing in a borehole intersecting the earth formation to collect shallow measurements of a property of the formation, defined to be measurements of the property of the formation adjacent the borehole and adjacent the logging tool, and deep measurements of the property of the formation, defined to be measurements of the property of the formation farther away from the logging tool than the shallow measurements. The system includes a processor in communication with the logging tool and operable to: perform an inversion on the shallow measurements to produce a group of possible formation models that fit the shallow measurements; apply a machine-learning algorithm to estimate the shallow formation structure, using the group of possible formation models that fit the shallow measurements, to produce a shallow formation structure; perform an inversion on the deep measurements to produce a group of possible formation models that fit the deep measurements; and expand the shallow formation structure using the group of possible formation models that fit the deep measurements to produce a deep formation structure.

Implementations may include one or more of the following. Performing an inversion on the deep measurements may include using the shallow measurements in the inversion in addition to the deep measurements and may include starting the inversion with the group of possible formation models that fit the shallow measurements. The processor may be further operable to, after expanding the fixed shallow formation structure using the group of possible formation models, determine that deeper measurements of the property of the formation, defined to be measurements by the logging tool of the property of the formation farther away from the logging tool than the deep measurements, are available and, in response: perform an inversion on one or more of the shallow measurements, the deep measurements, and the deeper measurements to produce a group of possible formation models that fit the deeper measurements, and expand the deep formation structure using the group of possible formation models that fit the deeper measurements to produce a deeper formation structure. Performing an inversion on one or more of the shallow measurements, the deep measurements, and the deeper measurements may include starting the inversion with one or more of the group of possible formation models that fit the shallow measurements and the group of possible formation models that fit the deep measurements. The response to determining that deeper measurements of the property of the formation are available may include, before performing the inversion on the deeper measurements: re-applying the machine-learning algorithm to estimate the shallow formation structure, using the group of possible formation models that fit the shallow measurements, to produce the shallow formation structure. Expanding the fixed shallow formation structure may include fixing the formation inversion results at the shallow formation structure for a shallow radial interval from a wall of the borehole to a shallow distance from the wall of the borehole; applying the machine-learning algorithm to estimate the deep formation structure, using the group of possible formation models that fit the deep measurements, to produce a deep formation structure; fixing the formation inversion results at the deep formation structure for a deep radial interval from the shallow distance from the wall of the borehole to a deep distance from the wall of the borehole; applying the machine-learning algorithm to estimate the deeper formation structure, using the group of possible formation models that fit the deeperer measurements, to produce a deeper formation structure; and fixing the formation inversion results at the deeper formation structure for a deeper radial interval from the deep distance from the wall of the borehole to a deeper distance from the wall of the borehole. Expanding the fixed shallow formation structure may include fixing the formation inversion results at the shallow formation structure for a shallow radial interval from a wall of the borehole to a shallow distance from the wall of the borehole; applying the machine-learning algorithm to estimate the deep formation structure, using the group of possible formation models that fit the deep measurements, to produce a deep formation structure; and fixing the formation inversion results at the deep formation structure for a deep radial interval from the shallow distance from the wall of the borehole to a deep distance from the wall of the borehole.

In one aspect, a non-transitory computer-readable medium has recorded on it a computer program. The computer program includes executable instructions, that, when executed, perform a method of evaluating a subterranean earth formation. The method includes running a process with a logging tool residing in a borehole in the earth formation to collect shallow measurements of a property of the formation, defined to be measurements of the property of the formation adjacent the borehole and adjacent the logging tool, and deep measurements of the property of the formation, defined to be measurement of the property of the formation farther away from the logging tool than the shallow measurements. The method includes performing an inversion on the shallow measurements to produce a group of possible formation models that fit the shallow measurements. The method includes applying a machine-learning algorithm to estimate the shallow formation structure, using the group of possible formation models that fit the shallow measurements, to produce a shallow formation structure. The method includes performing an inversion on the deep measurements to produce a group of possible formation models that fit the deep measurements. The method includes expanding the shallow formation structure using the group of possible formation models that fit the deep measurements to produce a deep formation structure.

Implementations may include one or more of the following. Performing an inversion on the deep measurements may include performing an inversion on the shallow measurements and the deep measurements and may include starting the inversion with the group of possible formation models that fit the shallow measurements. The method may further include, after expanding the fixed shallow formation structure using the group of possible formation models: determining that deeper measurements of the property of the formation, defined to be measurements by the logging tool of the property of the formation farther away from the logging tool than the deep measurements, are available and, in response: performing an inversion on one or more of the shallow measurement, the deep measurements, and the deeper measurements to produce a group of possible formation models that fit the deeper measurements, and expanding the deep formation structure using the group of possible formation models that fit the deeper measurements to produce a deeper formation structure. Performing an inversion on one or more of the shallow measurements, the deep measurements, and the deeper measurements may include starting the inversion with one or more of the group of possible formation models that fit the shallow measurements and the group of possible formation models that fit the deep measurements. The response to determining that deeper measurements of the property of the formation are available may include, before performing the inversion on the deeper measurements: re-applying the machine-learning algorithm to estimate the shallow formation structure, using the group of possible formation models that fit the shallow measurements, to produce the shallow formation structure. Expanding the fixed shallow formation structure may include fixing the formation inversion results at the shallow formation structure for a shallow radial interval from a wall of the borehole to a shallow distance from the wall of the borehole; applying the machine-learning algorithm to estimate the deep formation structure, using the group of possible formation models that fit the deep measurements, to produce a deep formation structure; fixing the formation inversion results at the deep formation structure for a deep radial interval from the shallow distance from the wall of the borehole to a deep distance from the wall of the borehole; applying the machine-learning algorithm to estimate the deeper formation structure, using the group of possible formation models that fit the deeper measurements, to produce a deeper formation structure; and fixing the formation inversion results at the deeper formation structure for a deeper radial interval from the deep distance from the wall of the borehole to a deeper distance from the wall of the borehole.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of evaluating a subterranean earth formation comprising:
    running a process with a logging tool residing in a borehole in the earth formation to collect shallow measurements of a property of the formation, defined to be measurements of the property of the formation adjacent the borehole and adjacent the logging tool, and deep measurements of the property of the formation, defined to be measurement of the property of the formation farther away from the logging tool than the shallow measurements;
performing an inversion on the shallow measurements to produce a group of possible formation models that fit the shallow measurements;
applying a machine-learning algorithm to estimate a shallow formation structure, using the group of possible formation models that fit the shallow measurements, to produce the shallow formation structure;
performing an inversion on the deep measurements to produce a group of possible formation models that fit the deep measurements, wherein performing the inversion on the deep measurements includes performing an inversion on one or more of the shallow measurements and the deep measurements and includes starting the inversion with the group of possible formation models that fit the shallow measurements;
expanding the shallow formation structure using the group of possible formation models that fit the deep measurements to produce a deep formation structure;
combining the shallow formation structure and the deep formation structure to produce a combined formation structure; and
prospecting for hydrocarbons, planning well drilling, controlling well drilling, performing production analysis, or performing reservoir analysis based on the combined formation structure.

2. The method of claim 1 further comprising, after expanding the fixed shallow formation structure using the group of possible formation models:
determining that deeper measurements of the property of the formation, defined to be measurements by the logging tool of the property of the formation farther away from the logging tool than the deep measurements, are available and, in response:
performing an inversion on one or more of the shallow measurements, the deep measurements, and the deeper measurements to produce a group of possible formation models that fit the deeper measurements, and
expanding the deep formation structure using the group of possible formation models that fit the deeper measurements to produce a deeper formation structure.

3. The method of claim 2 wherein performing the inversion on one or more of the shallow measurements, the deep measurements, and the deeper measurements includes starting the inversion with one or more of the group of possible formation models that fit the shallow measurements and the group of possible formation models that fit the deep measurements.

4. The method of claim 2 wherein the response to determining that deeper measurements of the property of the formation are available includes, before performing the inversion on the deeper measurements:
re-applying the machine-learning algorithm to estimate the shallow formation structure, using the group of possible formation models that fit the shallow measurements, to produce the shallow formation structure.

5. The method of claim 2 wherein expanding the fixed shallow formation structure comprises:
fixing the formation inversion results at the shallow formation structure for a shallow radial interval from a wall of the borehole to a shallow distance from the wall of the borehole;
applying the machine-learning algorithm to estimate the deep formation structure, using the group of possible formation models that fit the deep measurements, to produce a deep formation structure;
fixing the formation inversion results at the deep formation structure for a deep radial interval from the shallow distance from the wall of the borehole to a deep distance from the wall of the borehole;
applying the machine-learning algorithm to estimate the deeper formation structure, using the group of possible formation models that fit the deeper measurements, to produce a deeper formation structure; and
fixing the formation inversion results at the deeper formation structure for a deeper radial interval from the deep distance from the wall of the borehole to a deeper distance from the wall of the borehole.

6. The method of claim 1 wherein expanding the fixed shallow formation structure comprises:
fixing the formation inversion results at the shallow formation structure for a shallow radial interval from a wall of the borehole to a shallow distance from the wall of the borehole;
applying the machine-learning algorithm to estimate the deep formation structure, using the group of possible formation models that fit the deep measurements, to produce a deep formation structure; and
fixing the formation inversion results at the deep formation structure for a deep radial interval from the shallow distance from the wall of the borehole to a deep distance from the wall of the borehole.

7. A system for evaluating a subterranean earth formation, comprising:
a logging tool residing in a borehole intersecting the earth formation to collect shallow measurements of a property of the formation, defined to be measurements of the property of the formation adjacent the borehole and adjacent the logging tool, and deep measurements of the property of the formation, defined to be measurements of the property of the formation farther away from the logging tool than the shallow measurements; and
a processor in communication with the logging tool and operable to:
perform an inversion on the shallow measurements to produce a group of possible formation models that fit the shallow measurements;
apply a machine-learning algorithm to estimate a shallow formation structure, using the group of possible formation models that fit the shallow measurements, to produce the shallow formation structure;
perform an inversion on the deep measurements to produce a group of possible formation models that fit the deep measurements, wherein performing the inversion on the deep measurements includes using the shallow measurements in the inversion in addition to the deep measurements and includes starting the inversion with the group of possible formation models that fit the shallow measurements;
expand the shallow formation structure using the group of possible formation models that fit the deep measurements to produce a deep formation structure;
combine the shallow formation structure and the deep formation structure to produce a combined formation structure; and prospect for hydrocarbons, plan well drilling, control well drilling, perform production analysis, or perform reservoir analysis based on the combined formation structure.

8. The system of claim 7 wherein the processor is further operable to, after expanding the fixed shallow formation structure using the group of possible formation models:
determine that deeper measurements of the property of the formation, defined to be measurements by the logging tool of the property of the formation farther away from the logging tool than the deep measurements, are available and, in response:
perform an inversion on one or more of the shallow measurements, the deep measurements, and the deeper measurements to produce a group of possible formation models that fit the deeper measurements, and
expand the deep formation structure using the group of possible formation models that fit the deeper measurements to produce a deeper formation structure.

9. The system of claim 8 wherein performing the inversion on one or more of the shallow measurements, the deep measurements, and the deeper measurements includes starting the inversion with one or more of the group of possible formation models that fit the shallow measurements and the group of possible formation models that fit the deep measurements.

10. The system of claim 8 wherein the response to determining that deeper measurements of the property of the formation are available includes, before performing the inversion on the deeper measurements:
re-applying the machine-learning algorithm to estimate the shallow formation structure, using the group of possible formation models that fit the shallow measurements, to produce the shallow formation structure.

11. The system of claim 8 wherein expanding the fixed shallow formation structure comprises:
fixing the formation inversion results at the shallow formation structure for a shallow radial interval from a wall of the borehole to a shallow distance from the wall of the borehole;
applying the machine-learning algorithm to estimate the deep formation structure, using the group of possible formation models that fit the deep measurements, to produce a deep formation structure;
fixing the formation inversion results at the deep formation structure for a deep radial interval from the shallow distance from the wall of the borehole to a deep distance from the wall of the borehole;
applying the machine-learning algorithm to estimate the deeper formation structure, using the group of possible formation models that fit the deeper measurements, to produce a deeper formation structure; and
fixing the formation inversion results at the deeper formation structure for a deeper radial interval from the deep distance from the wall of the borehole to a deeper distance from the wall of the borehole.

12. The system of claim 7 wherein expanding the fixed shallow formation structure comprises:
fixing the formation inversion results at the shallow formation structure for a shallow radial interval from a wall of the borehole to a shallow distance from the wall of the borehole;
applying the machine-learning algorithm to estimate the deep formation structure, using the group of possible formation models that fit the deep measurements, to produce a deep formation structure; and
fixing the formation inversion results at the deep formation structure for a deep radial interval from the shallow distance from the wall of the borehole to a deep distance from the wall of the borehole.

13. A non-transitory computer-readable medium on which is recorded a computer program, the computer program comprising executable instructions, that, when executed, perform a method of evaluating a subterranean earth formation comprising:
running a process with a logging tool residing in a borehole in the earth formation to collect shallow measurements of a property of the formation, defined to be measurements of the property of the formation adjacent the borehole and adjacent the logging tool, and deep measurements of the property of the formation, defined to be measurement of the property of the formation farther away from the logging tool than the shallow measurements;
performing an inversion on the shallow measurements to produce a group of possible formation models that fit the shallow measurements;
applying a machine-learning algorithm to estimate a shallow formation structure, using the group of possible formation models that fit the shallow measurements, to produce the shallow formation structure;
performing an inversion on the deep measurements to produce a group of possible formation models that fit the deep measurements, wherein performing the inversion on the deep measurements includes performing an inversion on the shallow measurements and the deep measurements and includes starting the inversion with the group of possible formation models that fit the shallow measurements;
expanding the shallow formation structure using the group of possible formation models that fit the deep measurements to produce a deep formation structure;
combining the shallow formation structure and the deep formation structure to produce a combined formation structure; and
prospecting for hydrocarbons, planning well drilling, controlling well drilling, performing production analysis, or performing reservoir analysis based on the combined formation structure.

14. The computer-readable medium of claim 13 wherein the method further comprises, after expanding the fixed shallow formation structure using the group of possible formation models:
determining that deeper measurements of the property of the formation, defined to be measurements by the logging tool of the property of the formation farther away from the logging tool than the deep measurements, are available and, in response:
performing an inversion on one or more of the shallow measurement, the deep measurements, and the deeper measurements to produce a group of possible formation models that fit the deeper measurements, and
expanding the deep formation structure using the group of possible formation models that fit the deeper measurements to produce a deeper formation structure.

15. The computer-readable medium of claim 14 wherein performing the inversion on one or more of the shallow measurements, the deep measurements, and the deeper measurements includes starting the inversion with one or more of the group of possible formation models that fit the shallow measurements and the group of possible formation models that fit the deep measurements.

16. The computer-readable medium of claim 14 wherein the response to determining that deeper measurements of the property of the formation are available includes, before performing the inversion on the deeper measurements:
   re-applying the machine-learning algorithm to estimate the shallow formation structure, using the group of possible formation models that fit the shallow measurements, to produce the shallow formation structure.

17. The computer-readable medium of claim 14 wherein expanding the fixed shallow formation structure comprises:
   fixing the formation inversion results at the shallow formation structure for a shallow radial interval from a wall of the borehole to a shallow distance from the wall of the borehole;
   applying the machine-learning algorithm to estimate the deep formation structure, using the group of possible formation models that fit the deep measurements, to produce a deep formation structure;
   fixing the formation inversion results at the deep formation structure for a deep radial interval from the shallow distance from the wall of the borehole to a deep distance from the wall of the borehole;
   applying the machine-learning algorithm to estimate the deeper formation structure, using the group of possible formation models that fit the deeper measurements, to produce a deeper formation structure; and
   fixing the formation inversion results at the deeper formation structure for a deeper radial interval from the deep distance from the wall of the borehole to a deeper distance from the wall of the borehole.

\* \* \* \* \*